United States Patent [19]

Miller

[11] Patent Number: 6,038,320

[45] Date of Patent: Mar. 14, 2000

[54] COMPUTER SECURITY KEY

[75] Inventor: Phillip R. Miller, Beaverton, Oreg.

[73] Assignee: Intel Corporation, Santa Clara, Calif.

[21] Appl. No.: 08/731,222

[22] Filed: Oct. 11, 1996

[51] Int. Cl.$^7$ ...................................................... H04L 9/00
[52] U.S. Cl. .............................................................. 380/44
[58] Field of Search .................................. 380/4, 52, 23, 380/44; 340/825.44; 395/800

[56] References Cited

U.S. PATENT DOCUMENTS

| | | | |
|---|---|---|---|
| 3,806,874 | 4/1974 | Ehrat ......................................... | 380/23 |
| 4,652,990 | 3/1987 | Pailen et al. ................................ | 380/4 |
| 5,012,514 | 4/1991 | Renton ....................................... | 380/52 |
| 5,073,767 | 10/1997 | Holmes et al. ..................... | 340/825.44 |
| 5,388,156 | 2/1995 | Blackledge, Jr. et al. .................. | 380/4 |
| 5,535,409 | 7/1996 | Lavoire et al. .......................... | 395/800 |
| 5,539,828 | 7/1996 | Davis ......................................... | 380/52 |
| 5,802,176 | 9/1998 | Audebert .................................... | 380/23 |

*Primary Examiner*—Salvatore Cangialosi
*Attorney, Agent, or Firm*—Kenyon & Kenyon

[57] ABSTRACT

A computer security key provides security to a computer which includes a computer bus. The computer is programmed to function with the security key. The security key includes a connector that is adapted to be coupled to the computer bus, a controller coupled to the connector, and a storage device coupled to the controller. The connector must be coupled to the computer bus for the computer to be operational. In addition, a unique key code is stored in the security key and the computer. The key code stored in the security key must match the key code stored in the computer for the computer to be operational. Further, an encrypted password is stored in the security key. A password is entered into the computer and sent to the security key where it is encrypted by the security key. The encrypted password stored in the security key must match the encrypted password entered into the computer for the computer to be operational.

14 Claims, 9 Drawing Sheets

COMPUTER SECURITY KEY

BACKGROUND OF THE INVENTION

The present invention relates to computer security and, more particularly, to a computer security key that is required to be coupled to a bus in a computer to enable access to that computer.

Computer security prevents an unauthorized user from accessing a computer system. Computer security that is currently available typically prevents any input device from functioning unless that input device is used by an authorized user.

An example of computer security that is currently available is shown in FIG. 1. In FIG. 1, a computer 10 includes a central processing unit (CPU) 12 coupled to an address/data bus 16. Also coupled to the address/data bus 16 is a BIOS flash memory 14, in which is stored basic input/output system (BIOS) code. The BIOS code is the code that the CPU 12 uses to initialize the computer 10. A keyboard controller 18 is coupled to the address/data bus 16. The keyboard controller 18 controls a keyboard 17 which is coupled to the computer 10 through a keyboard port 19.

The keyboard controller 18 also provides computer security for the computer 10 by selectively preventing communication between the keyboard 17 and the CPU 12. Computer security exists for two states of the computer 10: Power-On Self Test (POST) and run-time. The POST state exists from the moment the computer 10 is powered on until the Operating System (OS) is loaded and in control. The computer 10 is in run-time state at any time thereafter.

If the keyboard controller 18 has been enabled to apply security to the computer 10, a POST program will prompt the user for a password when the computer 10 is initially powered on. When a password is entered via the keyboard 17 by the user, it is compared to a stored password in the BIOS flash memory 14. If the passwords do not match, the keyboard controller 18 will not allow the keyboard 17 to communicate with the CPU 12, or the computer 10 to boot.

After the user enters the password, the computer 10 boots into the run-time state. A secure mode may be entered by pressing a hot-key sequence (e.g. Ctrl-Alt-L). Secure mode may also be entered optionally via inactivity of the computer 10. In secure mode, all communication from the keyboard 17 to the CPU 12 other than password entry is blocked by the keyboard controller 18 until the user enters a previously defined password.

FIG. 2 illustrates an example of a computer 20 which includes an external bus. An external bus is a computer bus that has external connectors which can be used to couple external peripherals to the CPU 12. The external bus shown in FIG. 2 is the Universal Serial Bus (USB) 28. Detailed specifications for the USB 28 may be found in *Universal Serial Bus Specification Revision* 1.0, Jan. 15, 1996, Copyright © 1996, Compaq Computer Corporation, Digital Equipment Corporation, IBM PC Company, Intel Corporation, Microsoft Corporation, NEC, Northern Telecom.

The computer 20, like the computer 10 in FIG. 1, includes a CPU 12, a BIOS flash memory 24 and a keyboard controller 18 coupled to a data/address bus 16. Further coupled to the data/address bus 16 is a USB controller 26. The USB controller 26 is also coupled to a USB port 31 through a USB 28. A USB hub 30 is plugged into the USB port 31 to allow more devices to be coupled to the USB 28 through USB port 31. The USB hub 30 includes multiple USB ports 32. A USB keyboard 34 is plugged into a USB port 32 of the USB hub 30.

In the computer 20, all run-time security through the keyboard controller 18 is easily defeated. Specifically, when the computer 20 is secured during run-time, all communication from the keyboard 17 to the CPU 12 other than password entry is blocked by the keyboard controller 18 until the user enters a previously defined password. However, when a USB keyboard 34 is plugged into a USB port 32, the USB keyboard 34 is instantly recognizable and usable. The USB keyboard 34 completely bypasses the keyboard controller 18, and therefore allows access to the computer 20.

Based on the foregoing, there is a need for a security device that provides security to a computer which includes a universal type serial bus.

SUMMARY OF THE INVENTION

The present invention includes a computer security key for providing security to a computer which includes an external computer bus. The present invention further includes the computer that is programmed to function with the security key. The computer security key includes a connector that is adapted to be coupled to the computer bus, a controller coupled to the connector, and a storage device coupled to the controller. The connector must be coupled to the computer bus for the computer to be operational.

DETAILED DESCRIPTION

Figure 1:
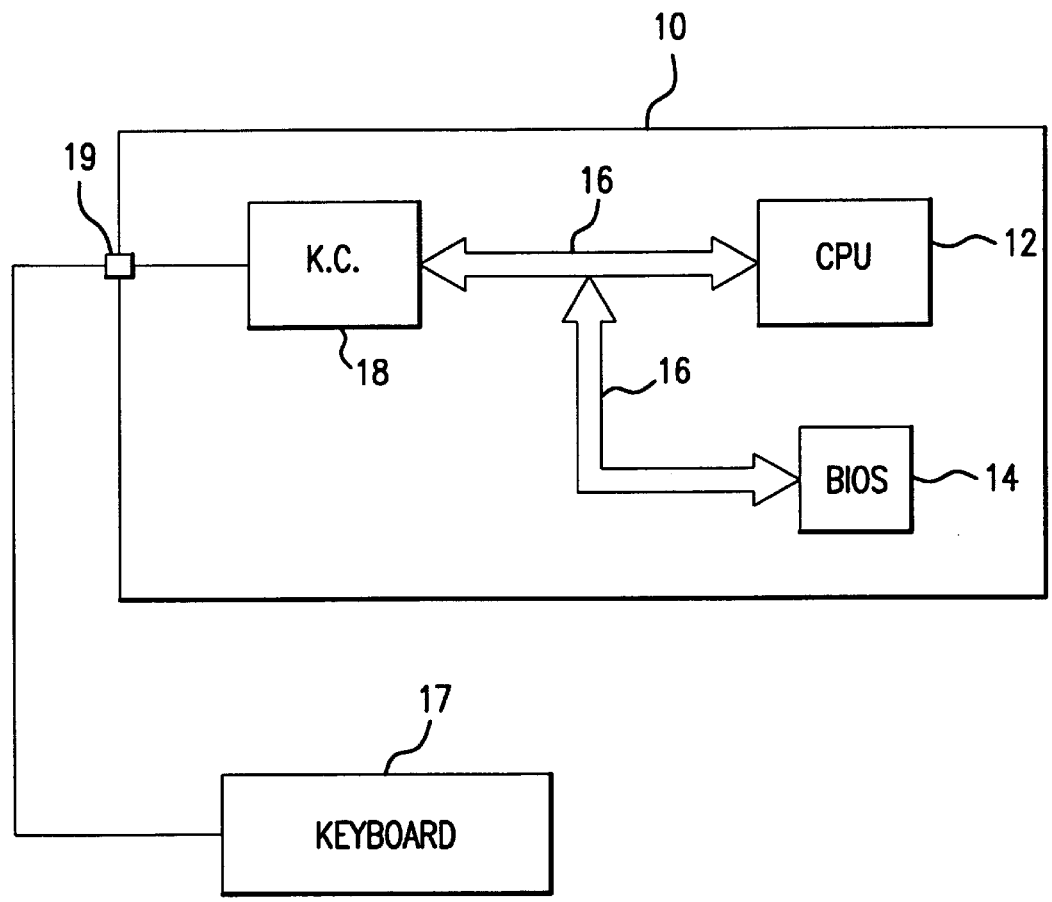
FIG. 1 is a block diagram of a computer utilizing prior art computer security.
Figure 2:
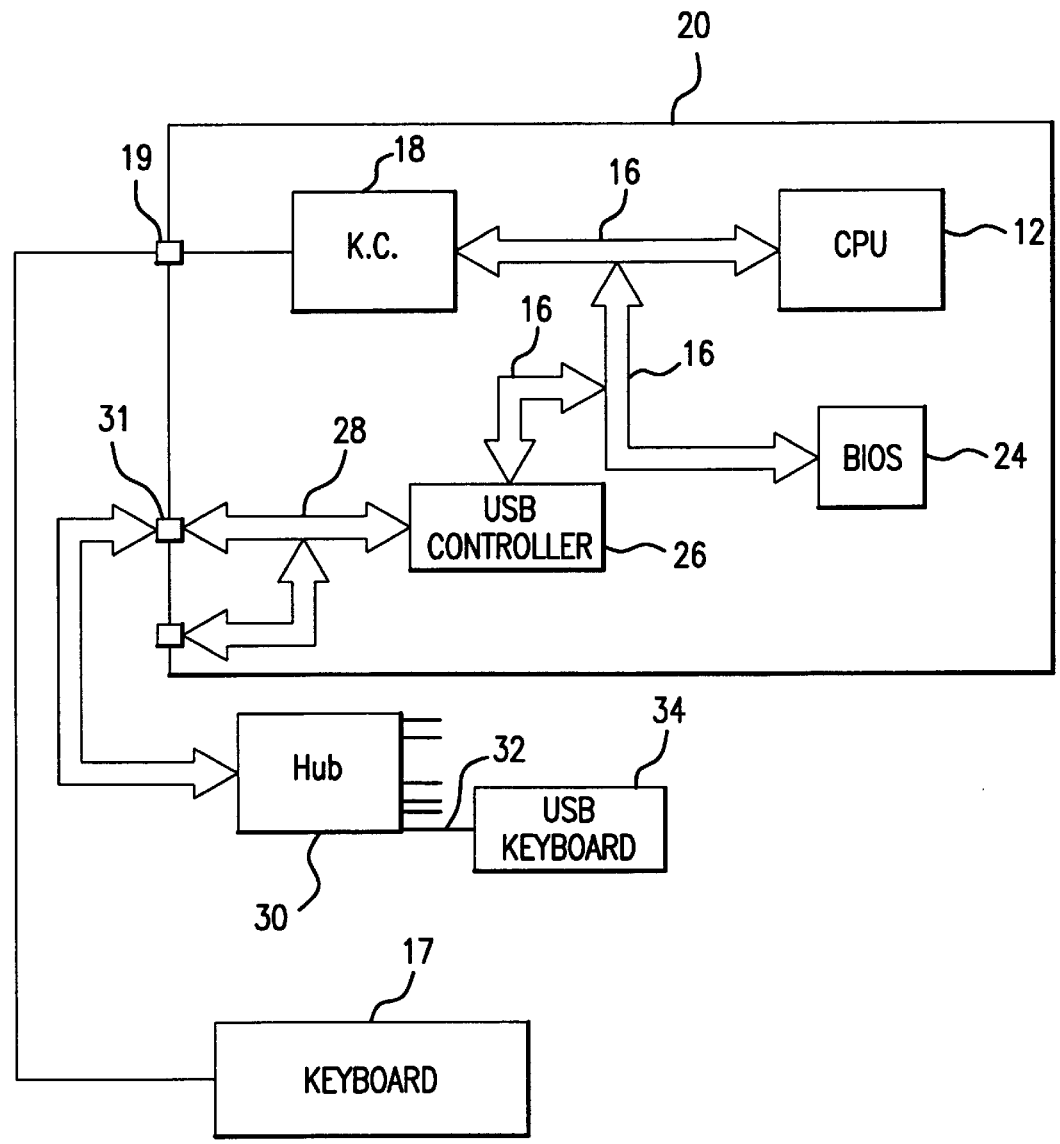
FIG. 2 is a block diagram of a computer with a universal type bus that can be programmed to perform the present invention.

The present invention includes both a computer security key and the computer 20 shown in FIG. 2 programmed to perform the steps described herein.

Figure 3:
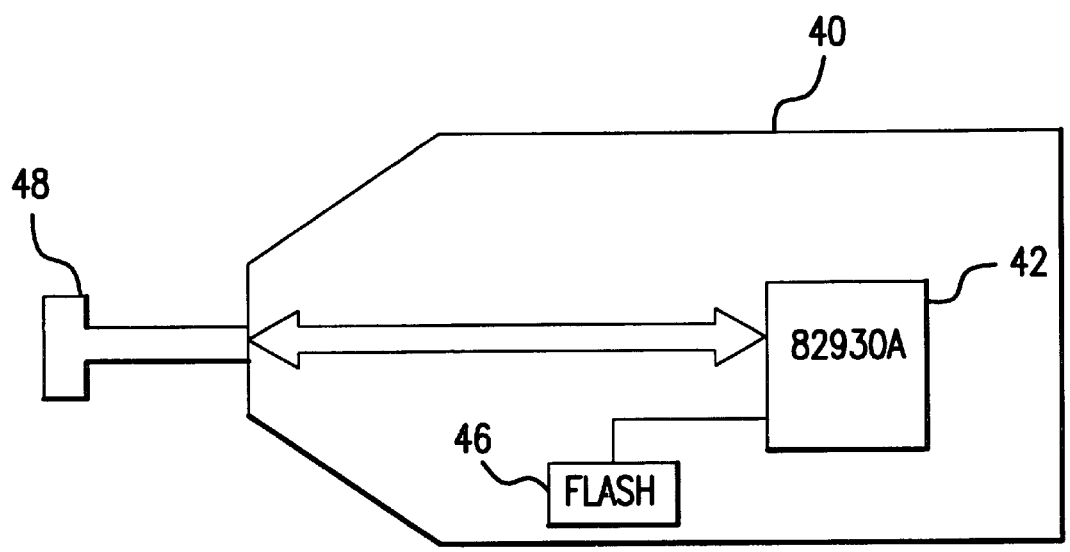
FIG. 3 is a block diagram of a computer security key of the present invention.

FIG. 3 is a block diagram of an embodiment of the computer security key. The computer security key 40 includes a USB plug 48 that plugs into a single USB port, such as the USB port 32 or the USB port 31 in the computer 20 shown in FIG. 2. The computer security key 40 further includes a controller 42 coupled to the plug 48. The controller 42 is preferably an 82930A USB microcontroller from Intel Corporation, but it can be any type of controller that is capable of interfacing with the USB 28 and being programmed to execute the steps described herein. A key flash memory 46 is coupled to the controller 42. Each computer security key 40 is assigned a unique key code. The key code is stored in flash memory 46. Similarly, each computer 20 is assigned a key code that corresponds to a security key. The computer 20 stores the key code in its BIOS flash memory 24.

Figure 4A:
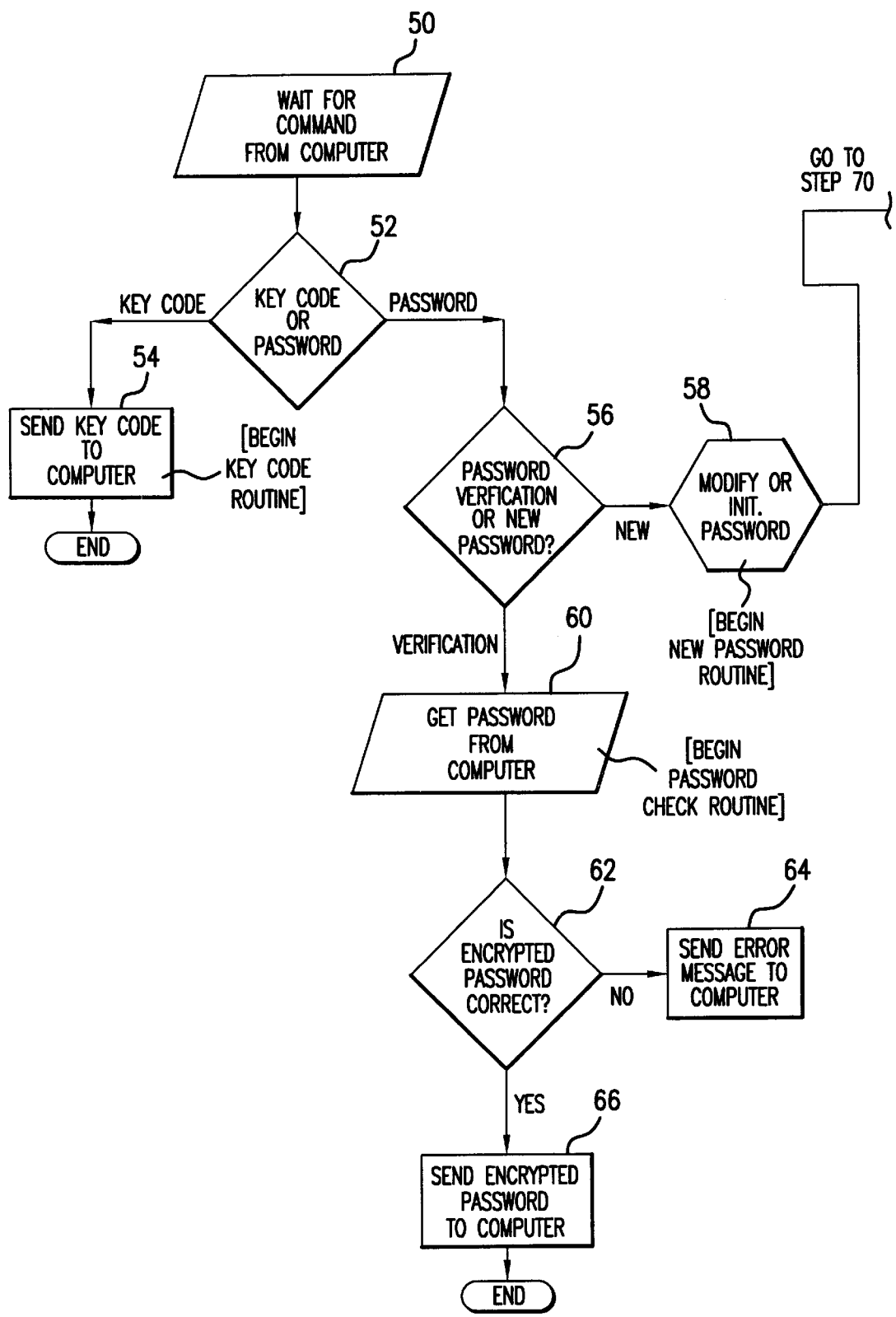
FIGS. 4A and 4B are flowcharts of the steps performed by the computer security key in response to commands from the computer.
Figure 4B:
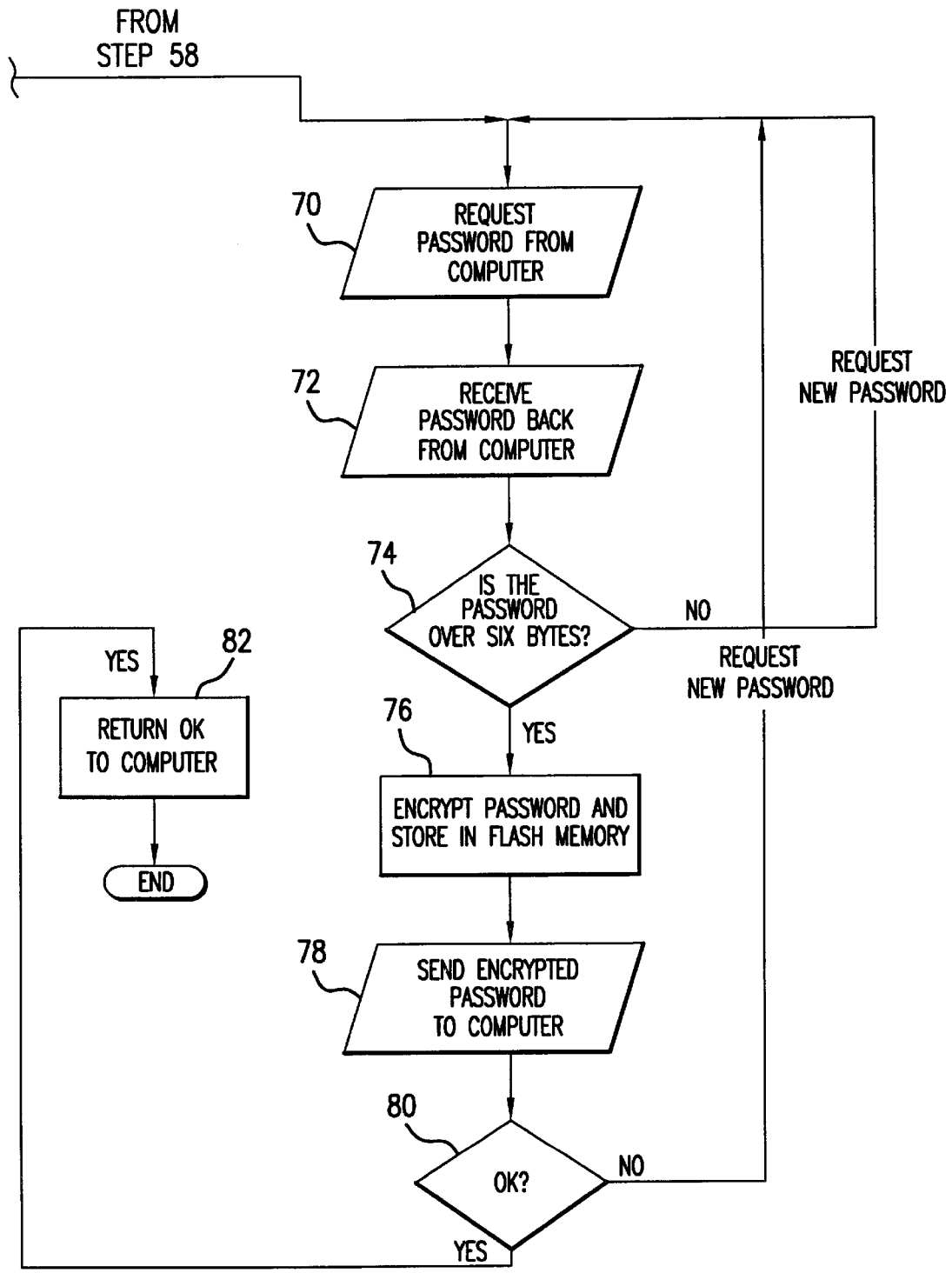

FIG. 4 is a flowchart of the steps performed by the security key 40 in response to commands from the computer 20 shown in FIG. 2. The commands are sent from the computer 20 to the security key 40, and responses are in turn sent from the security key 40 to the computer 20, via the USB 28. In the illustrated embodiment, the steps are stored the ROM/RAM memory of the controller 42 and are performed by the controller 42. However, the functionality of each step can be implemented using any combination of hardware and software.

At step 50, the security key 40 is in a wait state waiting for a command from the computer 20. When a command arrives via the USB 28, the key 40 goes to step 52 and determines whether the command is a key code or a password command. If the command is a key code command, the key 40 begins the key code routine at step 54. At step 54, the key 40 sends its key code stored in flash memory 46 to the computer 20 via the USB 28.

If the key 40 determines that the command at step 52 is a password command, the key 40 goes to step 56. At step 56, the key 40 determines whether the computer 20 requires a password verification, or if the computer 20 requires a new password (either an initial password or a change of an existing password). The determination at step 56 is based on the command received from the computer 20. If a password verification is requested, the key 40 goes to step 60. Otherwise, the key 40 goes to step 58.

Step 58 is the start of the new password routine that is performed by the key 40 when the key 40 is initialized, or when an existing password is changed to a new password. After step 58, the key 40 goes to step 70 where it requests a password from the computer 20. At step 72, after a password has been entered at the computer 20 via any keyboard such as keyboard 17 or keyboard 34, the entered password is received by the key 40. At step 74, the key 40 determines if the entered password is over six bytes, or if it differs from another predetermined size. If the entered password differs from the predetermined size, the key 40 branches back to step 70 and another password is requested. If the entered password is the predetermined size, the key 40 goes to step 76 where the password is encrypted, using any known encryption routine, and stored in the flash memory 46. At step 78, the encrypted password is sent to the computer 20.

At step 80, if the computer 20 properly received the encrypted password an "OK" or acknowledgment will be sent to the key 40. If no OK is received, the key 40 branches to step 70. If the OK is received, an OK is returned to the computer 20 at step 82.

If a password verification is requested at step 56, the key 40 branches to step 60. Step 60 is the start of the password check routine that determines if a password entered into the computer 20 via a keyboard or other input device attached to the computer 20 is correct. At step 60, the entered password is received from the computer 20. At step 62 the received password is encrypted and compared to the encrypted password stored in the flash memory 46. If they are not the same, the key 40 sends an error message to the computer 20 at step 64. If the passwords match at step 62, at step 66 the encrypted password is sent to the computer 20.

Figure 5:
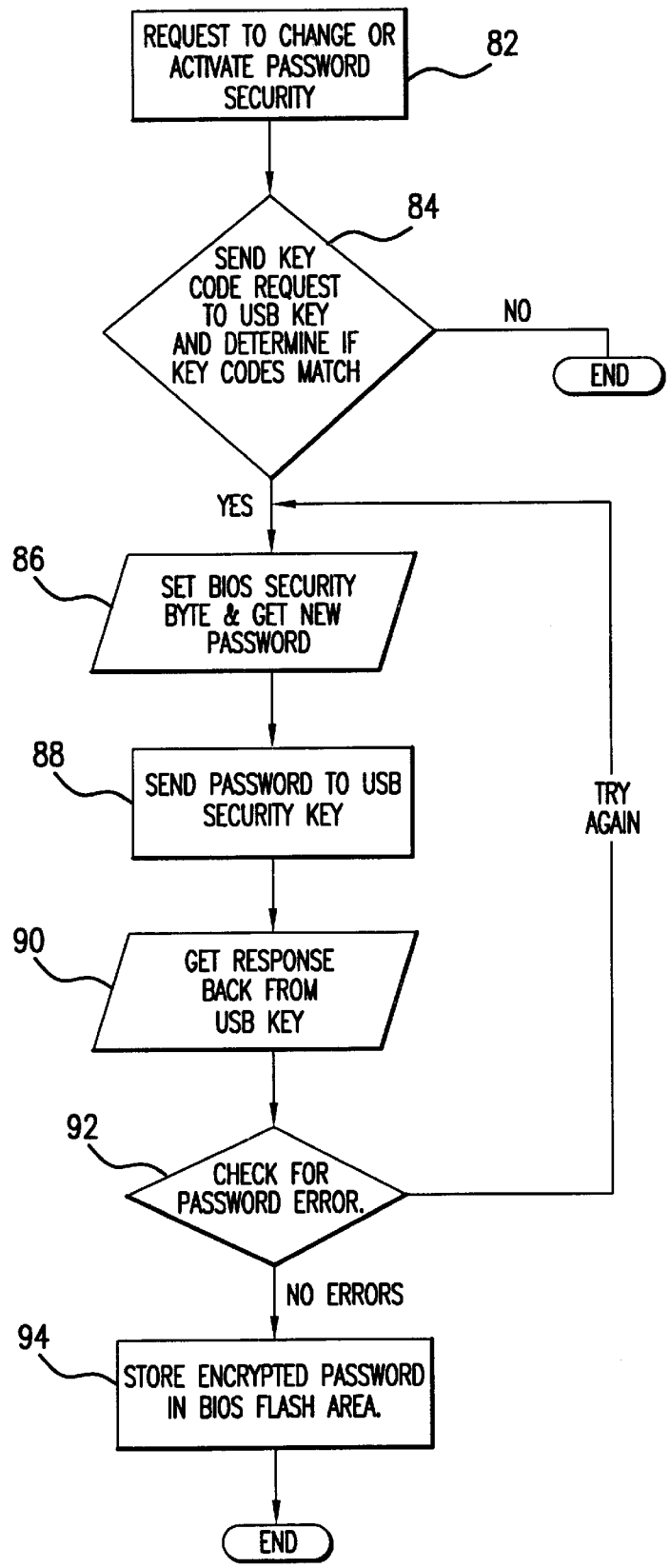
FIG. 5 is a flowchart of the steps performed by the computer when it receives a request to change the password or activate the password for the first time.

FIG. 5 is a flowchart of the steps performed by the computer 20 when it receives a request to change the password or activate password security for the first time. The program for performing the steps of FIG. 5, and all programs that are used by the computer 20 in conjunction with the key 40 can be stored on any computer-readable media.

At step 82, the computer 20 receives a request to change an existing password or activate password security for the first time. At step 84, the computer 20 checks if the key 40 is present and sends a key code request to the key 40. After processing by the key 40 (step 54 in FIG. 4), the key code is received from the security key 40. The key code must match the key code that is assigned to the computer 20 and stored in BIOS flash memory 24. If the password security is being activated for the first time, the key code that is received from the key 40 is stored in the flash memory 24, and the key codes match by default. If there is no match, the correct key 40 is not present and the routine is ended. If there is a match, the key 40 is present, and at step 86 the computer 20 sets a security byte in the BIOS flash 24 that indicates that security is activated, and asks for a password from the user. The user enters the password via a keyboard attached to the computer 20. At step 88, the password is sent to the key 40 with a new password command. After processing by the key 40 (step 58 in FIG. 4), a response is received at step 90. At step 92, if the response from the key 40 was an error message, the routine branches to step 86. Otherwise an encrypted password was received from the key 40, and the encrypted password is stored in the BIOS flash 24.

Figure 6:
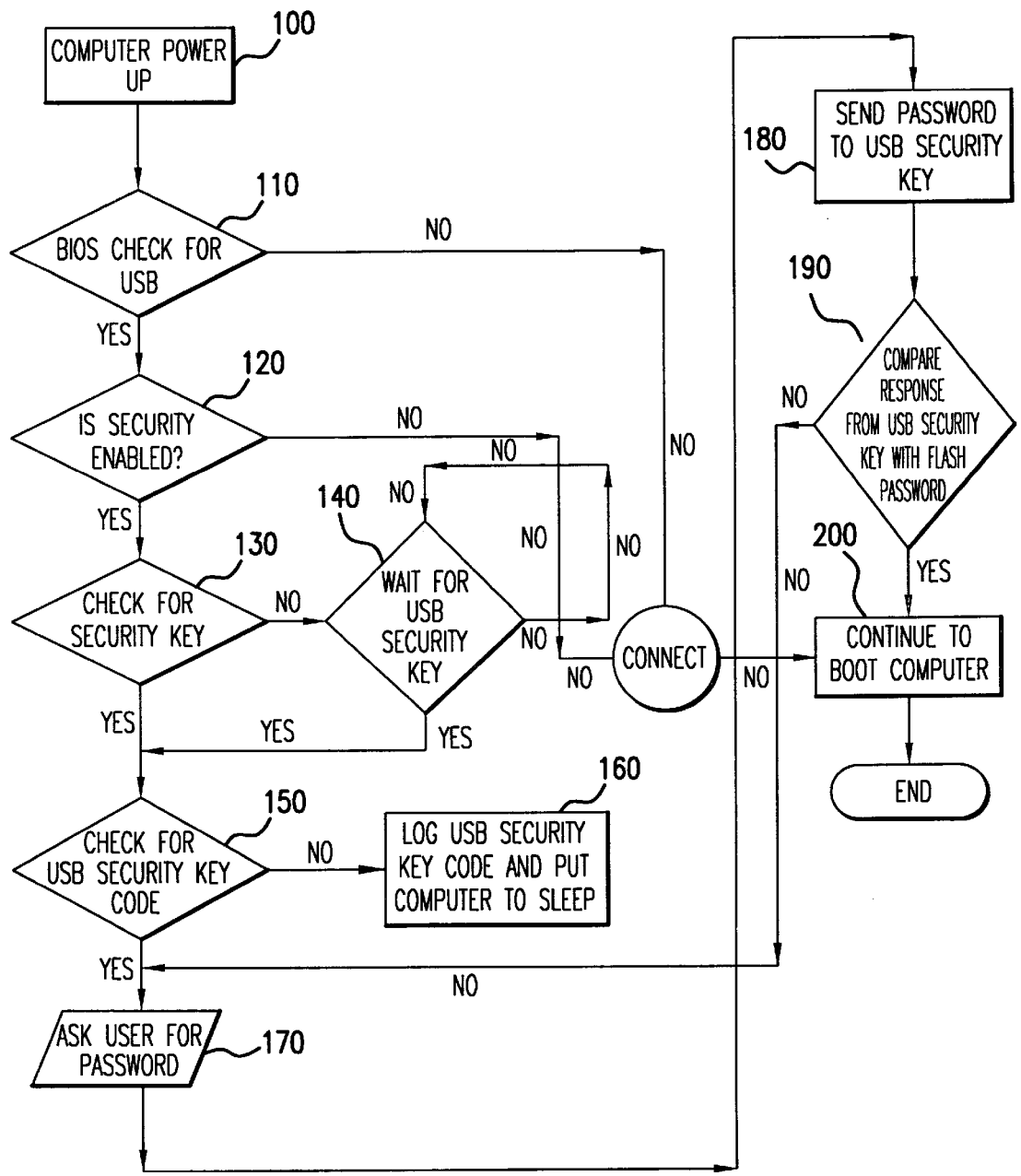
FIG. 6 is a flowchart of the steps performed by the computer when it is powered up or is subject to a reset.

FIG. 6 is a flowchart of the steps performed by the computer 20 when it is powered up or is subject to a reset. The steps of FIG. 6 are preferably part of the computer 20's POST or boot, and therefore part of its BIOS routine.

At step 100, the computer 20 is powered up. At step 110 the BIOS checks for the presence of a USB such as USB 28. If a USB is not present in the computer 20, the routine branches to step 200 where the boot procedure is continued. If a USB is present, the routine determines if security is enabled for the computer 20 at step 120 by checking if the security byte is set in the BIOS flash memory 24. If security is not enabled, the routine branches to step 200. If security is enabled, at step 130 the routine determines whether the security key 40 is present. The security key 40 is present when it has been inserted into a USB port and is coupled to the USB 28. The presence of the security key 40 can be detected by the computer 20.

If the security key 40 is not present, the routine branches to step 140 where the computer 20 waits for the security key 40. At step 140, the boot procedure is halted until the security key 40 is present. When the security key 40 is present, the routine at step 150 checks for the security key code by sending a key code check command to the security key 40. After processing by the key 40 (step 54 in FIG. 4), the key code is received from the security key 40. The key code must match the key code that is assigned to the computer 20 and stored in BIOS flash memory 24. If a different or incorrect key code is received, the routine branches to step 160, where the received key code is stored and the computer 20 is placed in sleep mode so that it cannot be accessed. The stored received key code can be used to later identify the incorrect security key 40 that was used.

If the received security key code is correct at 150, the routine at 170 asks the user for their password. The user enters the password via a keyboard attached to the computer 20. When the password is received, at step 180 it is sent to the security key 40 via the USB 28 along with a password check command. After processing by the key 40 (step 60 in FIG. 4), a response is received at step 190. The response is compared with the encrypted password stored in the BIOS flash 24. If they do not match, the routine branches to step 170 where the user is asked for another password. Until the correct password is entered at step 170, the computer 20 will not fully boot and is not operational. If the passwords match at step 190, the routine at step 200 continues to boot the computer 20.

After the computer 20 has completed its boot, the operating system is loaded and controls the computer 20. Some operating systems do not interface with the BIOS routine or allow access to the BIOS flash 24 once they are in control of the computer 20. These operating systems store a copy of the key code and encrypted password in the main memory of the computer 20 as part of their boot routine. Examples of such operating systems are Windows® 95 and Windows® NT from the Microsoft Corp.

Figure 7:
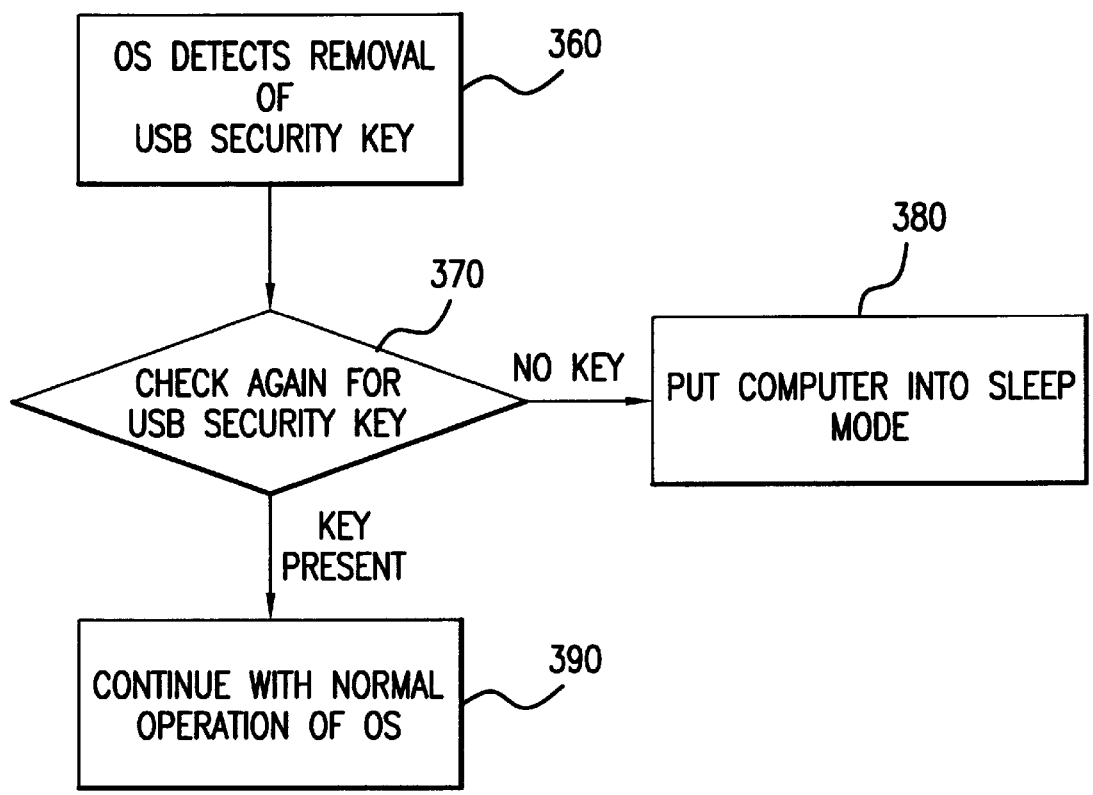
FIG. 7 is a flowchart of the steps performed by the computer when the security key is removed while the computer is running.

FIG. 7 is a flowchart of the steps performed by the computer 20 when the security key 40 is removed while the computer 20 is running. The steps in FIG. 7 are performed by an operating system that is the type that does not interface with the BIOS routine or allow access to the BIOS flash 24 once it is in control of the computer 20.

At step 360, the operating system detects the removal of the security key 40. At step 370, the presence of the security key 40 is checked again in case the detection of its removal at step 360 was inaccurate. Step 370 includes sending a key code request to the key 40, waiting for the response, and comparing the response to the key code stored in memory. If the response matches the key code stored in main memory, the key 40 is present and at step 390 the operating system continues with normal operation. However, if at step 370 the security key 40 is not present, at step 380 the computer 20 is placed in sleep mode so that it is not operational.

Figure 8:
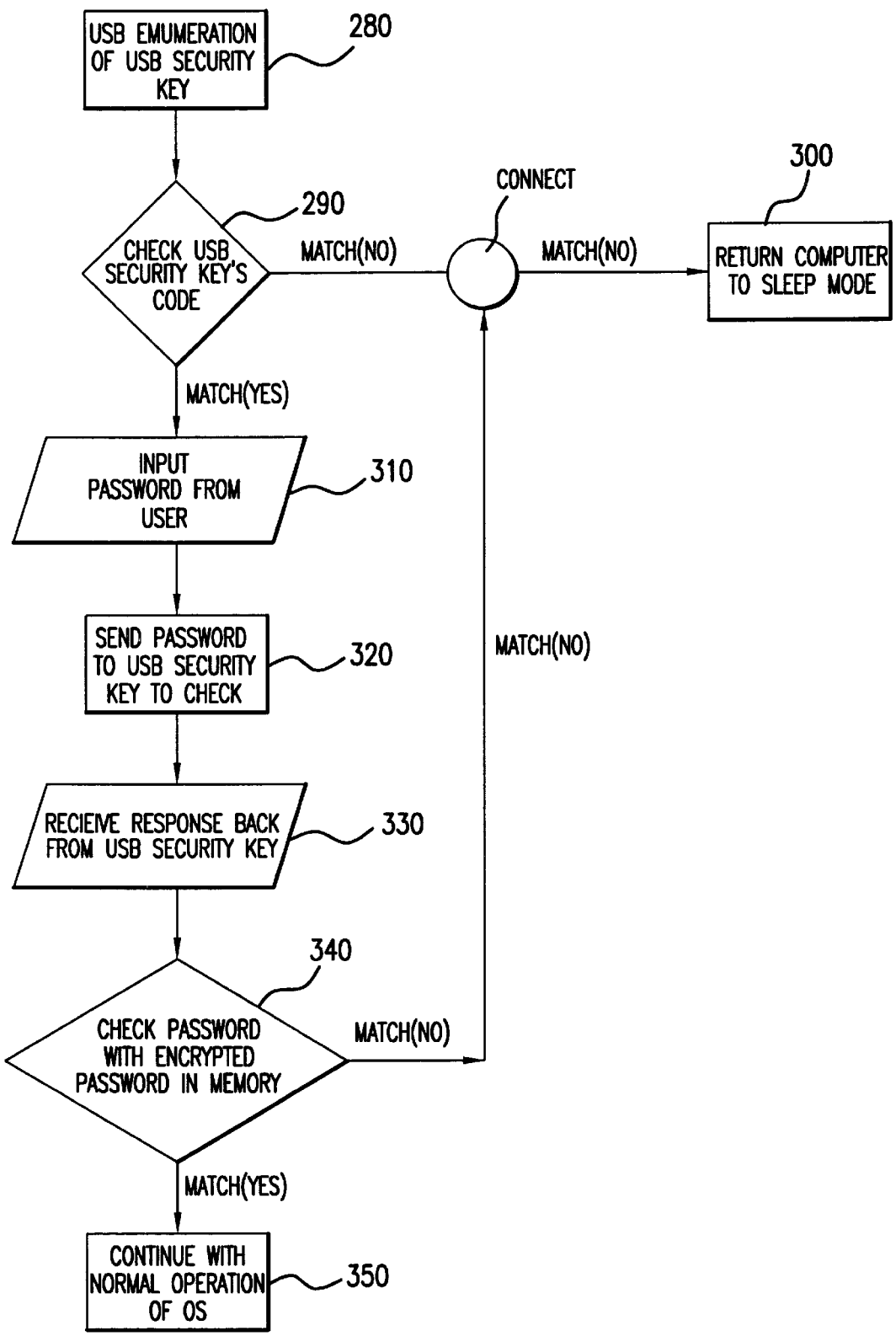
FIG. 8 is a flowchart of the steps performed by the computer of the present invention when the computer is in sleep mode and the security key is coupled to the bus.

FIG. 8 is a flowchart of the steps performed by the operating system of the computer 20 when the computer 20 is in sleep mode and a security key 40 is coupled to the USB 28. The steps in FIG. 8 are performed by an operating system that is the type that does not interface with the BIOS routine or allow access to the BIOS flash 24 once it is in control of the computer 20.

At step 280 the security key 40 is inserted into a USB port. This results in a USB enumeration which alerts the operating system that a security key 40 has been inserted. At step 290 the security key code is checked by sending a key code check command to the security key 40. After processing by the key 40 (step 54 in FIG. 4), the key code is received from the security key 40. If the received key code does not match the key code stored in memory in the computer 20, the operating system returns the computer to sleep mode at step 300.

If the key codes match, at step 310 the user inputs the password via a keyboard attached to the computer 20. When the password is received, at step 320 it is sent to the security key 40 via the USB 28 along with a password check command. After processing by the key 40 (step 60 in FIG. 4), a response is received at step 330. At step 340 the response is compared with the encrypted password stored in main memory. If they do not match, the computer 20 is returned to sleep mode at step 300. If the passwords match at step 340, at step 350 the operating system of the computer 20 continues with normal operation.

If the operating system on computer 20 is of the type that interfaces with the BIOS routine and allows access to the BIOS flash 24, such as Windows® 3.X and DOS® from the Microsoft Corp., the steps performed in FIGS. 7 and 8 are slightly modified. Specifically, in FIG. 7 at step 360, the BIOS routine instead of the operating system detects the removal of the security key 40. In FIG. 7 at step 370, the key code received from the key 40 is compared to the key code stored in the BIOS flash 24 instead of in main memory. Finally, in FIG. 8 at step 340, the received encrypted password from the security key 40 is checked with the encrypted password stored in the BIOS flash 24 instead of the main memory.

The use of a computer that includes a USB is merely illustrative of the application of the principles of the present invention. The present invention is applicable to any computer that includes an external bus which allows external peripherals to be coupled to the CPU.

What is claimed is:

1. A computer security key for a computer system with a central processing unit (CPU) which includes an external bus through which access to the CPU is provided, said computer security key comprising:
    a connector adapted to be coupled to the external bus;
    a controller coupled to said connector; and
    a storage device coupled to said controller which includes
        a location for storing a first key code and a reprogrammable location for storing an encrypted, user-selectable, first password;
    wherein said controller is programmed to
        provide, in response to a request received through said connector, said first key code as an output on said connector;
        encrypt a second password received through said connector; and
        provide a comparison of the encrypted second password with said encrypted, user-selectable first password.

2. The computer security key of claim 1, wherein said encrypted second password must match said encrypted, user-selectable, first password for the computer system to be operational.

3. The computer security key of claim 1, wherein said connector is a universal serial bus (USB) plug.

4. A computer system comprising:
    a computer, said computer comprising:
        a processor;
        a first storage device coupled to said processor;
        an external bus extending from said computer and coupled to said processor;
        an input device coupled to said external bus; and
    a security key, said security key comprising:
        a connector adapted to couple said security key to said external bus;
        a controller coupled to said connector; and
        a second storage device coupled to said controller which includes a location for storing a first key code and a reprogrammable location for storing an encrypted, user-selectable, first password;
        wherein said controller is programmed to
            provide, in response to a request received from said computer, said first key code as an output on said connector;
            encrypt a second password received from said computer; and
            provide a comparison of the encrypted second password with said encrypted, user-selectable, first password.

5. The computer system of claim 4, wherein said computer further comprises a second key code stored in said first storage device.

6. The computer system of claim 4, wherein said processor is programmed to receive said second password from said input device and send said second password to said security key.

7. The computer system of claim 4, wherein said encrypted second password must match said encrypted, user-selectable, first password for said computer to be operational.

8. The computer system of claim 4, wherein said connector is a universal serial bus (USB) plug and said external bus is a USB.

9. A method of providing computer security in a computer system which includes a computer, a bus extending externally from said computer, and a security key adapted to be coupled to said bus, said method comprising the steps of:

- storing a first key code and a user-selectable first password in the security key, wherein the user-selectable first password is received from the computer, encrypted by the security key, and stored in a reprogrammable location of the security key;
- storing a second key code in the computer;
- receiving a second password at said computer; sending the second password to the security key, wherein the second password is encrypted by the security key; and
- preventing the computer from being operational unless the security key is coupled to the bus and compares the encrypted user-selectable first password with the encrypted second password, the computer determines that the first key code matches the second key code, and the encrypted user-selectable first password matches the encrypted second password.

10. The method of claim 9, further comprising the steps of:

a) inputting the first password into the computer; and b) sending the first password from the computer to the security key.

11. The method of claim 10, further comprising the steps of:

- sending the encrypted user-selectable first password from the security key to the computer;
- storing the encrypted user-selectable first password in the computer.

12. The method of claim 11, further comprising the steps of:

- sending the encrypted second password from the security key to the computer;
- comparing the encrypted second password to the encrypted user-selectable first password stored in the computer; and
- preventing the computer from being operational unless the encrypted second password matches the encrypted user-selectable first password stored in the computer.

13. The computer security key of claim 1, wherein the reprogrammable location for storing an encrypted, user-selectable, first password is reprogrammable through said connector.

14. The computer system of claim 4, wherein the reprogrammable location for storing an encrypted, user-selectable, first password is reprogrammable through said connector.

* * * * *